(12) United States Patent
Arilla et al.

(10) Patent No.: US 6,776,573 B2
(45) Date of Patent: Aug. 17, 2004

(54) BLADED ROTOR DISC SIDE-PLATE AND CORRESPONDING ARRANGEMENT

(75) Inventors: Jean-Baptiste Arilla, Soisy sur Seine (FR); Michel-Gérard-Paul Hacault, Massy (FR); Jean-Philippe-Julien Maffre, Dammarie les Lys (FR); Somphone Sombounkhan, Yerres (FR)

(73) Assignee: SNECMA Moteurs, Paris (FR)

( * ) Notice: Subject to any disclaimer, the term of this patent is extended or adjusted under 35 U.S.C. 154(b) by 12 days.

(21) Appl. No.: 10/181,434

(22) PCT Filed: Nov. 29, 2001

(86) PCT No.: PCT/FR01/03777

§ 371 (c)(1),
(2), (4) Date: Jul. 25, 2002

(87) PCT Pub. No.: WO02/44526

PCT Pub. Date: Jun. 6, 2002

(65) Prior Publication Data

US 2003/0012651 A1 Jan. 16, 2003

(30) Foreign Application Priority Data

Nov. 30, 2000 (FR) .............................................. 00 15474

(51) Int. Cl.$^7$ ................................................ F01D 11/00
(52) U.S. Cl. ..................... 415/115; 415/174.5; 415/180
(58) Field of Search ........................... 415/173.7, 174.4, 415/174.5, 115, 116, 178, 180, 199.5; 416/95

(56) References Cited

U.S. PATENT DOCUMENTS

| 2,928,650 A | 3/1960 | Hooker et al. |
| 3,455,537 A | 7/1969 | Kozlin et al. |
| 4,466,239 A | 8/1984 | Napoli et al. ............... 60/39.02 |
| 5,310,319 A | 5/1994 | Grant et al. ............ 416/220 R |
| 5,597,167 A | 1/1997 | Snyder et al. ................. 277/53 |
| 5,816,776 A * | 10/1998 | Chambon et al. ......... 415/174.5 |
| 5,984,636 A | 11/1999 | Fahndrich et al. ........ 416/96 R |

* cited by examiner

Primary Examiner—Edward K. Look
Assistant Examiner—Dwayne J. White
(74) Attorney, Agent, or Firm—Oblon, Spivak, McClelland, Maier & Neustadt, P.C.

(57) ABSTRACT

A flange covering a disc of a turbine blade to allow ventilation. A diverted face of the disc is provided with a labyrinth seal with lickers to form a seal. Cutters of the lickers are inclined axially and staggered axially and radially, to off-set the center of gravity of a flexible web of the disc and to encourage deformation of the web towards the disc under the effect of centrifugal forces, to reinforce the contact of a bearing face with a pressure plate of the disc. Thus, hooks usually used to unite the periphery of the web to the disc become superfluous.

9 Claims, 2 Drawing Sheets

BLADED ROTOR DISC SIDE-PLATE AND CORRESPONDING ARRANGEMENT

BACKGROUND OF THE INVENTION

The invention relates to a rotor bladed disc flange and its layout in a turbo-engine.

Reactor turbines often have to be cooled in order to withstand the heating from the gas from the combustion chamber flowing across them, especially in the first turbine stages. Cooling systems have been developed by ventilation through which the coolest gas is bled off from a portion of the machine upstream from the combustion chamber and blown into the exposed layers of the turbines. In certain special layouts, a flange fixed to the rotor covers the turning disc to be ventilated, under the blade roots, and the gas is blown between the flange and the disc until it enters the borings crossing the periphery of the discs between the blades. Thus, the disc is well ventilated and above all the hottest portions of the periphery.

The flange extends between a hub fixed to the rotor and a free periphery adjacent to the disc and which must be maintained next to it in order to avoid any leaks of ventilation gas. In the state of the art, the centrifugal forces produced by the operation of the machine deform the flange by separating it from the disc, which breaks the seal and requires the use of hooks on the disc to remedy this, under which the flange edge is engaged. However, the hooks have a disadvantage in that they raise the manufacturing costs of the disc and are fragile.

A flange assembly in which the edge is retained by hooks on the disc is described in the document U.S. Pat. No. 4,466,239, in which the flange is practically plane.

An analysis of the action of the centrifugal forces leads to detailing the shape of the flange. Generally, there is a principal flexion zone for the flange sections in an axial plane, whose position is greatly responsible for the behaviour of the flange assembly under the effect of centrifugal forces, even if all the portions of the flange are submitted. This zone resembles a pivot beyond which the flange remains approximately non-deformable and beyond which it deforms much more either because of its flexibility or because of its distance from the axis of rotation. Thus a normal shape for the flange comprises, from the flat hub where it is fixed to the rotor, an arm in the form of a tubular sleeve, and then a closely flat web. The arm is lightened by making it almost as thin as the web; the principal flexion zone then tends to be on the arm, which deforms by opening on the web side; this then tilts moving away from the disc.

This is why the patent WO-99 32761 proposes a different layout; where the flange is essentially deprived of the sleeve and essentially comprises, after the hub, a very rigid bulged part and then an increasingly thin web inclined when moving away from the disc. The flexion zone is inclined moving away from the disc. The principal flexion zone is then located on the web; furthermore, the flange is provided with a flyweight near the periphery of the web, beyond the principal flexion zone and which protrudes from the diverted side of the disc: the centrifugal forces result in straightening the flange by reducing the inclination of the portion including the flyweight, thus pressing the free end of the flange tightly against the disc. The maintenance hooks thus become superfluous. Nonetheless, the flyweight represents a considerable extra weight for the flange.

SUMMARY OF THE INVENTION

Thus, according to the invention, the aim is to obtain a similar effect for tilting the flange under the action of the centrifugal forces but without this effect being produced by a special part. It is proposed instead to use what are called labyrinth seal lickers, often found in turbo-reactors to establish a seal all along the flange.

The lickers of a labyrinth seal comprise a portion of sleeve or junction with the support part of the licker and a cutter portion which tapers towards a free end and establishes the seal by penetrating a crown of easy erosion ("abradable") material fixed to the other part connected by the joint. Contrary to the usual construction where the licker knives are arranged radially outwards towards the exterior, here they are inclined axially moving away from the disc, which off-centres them and thus increases the tilting moment towards the disc produced by the centrifugal forces at the edge of the flange. Furthermore, axial and radial shifts of the cutter parts of the lickers are adopted so as to increase the off-centring of the lickers and to adjust the overall effect of the centrifugal forces by distributing them over the web. It will be seen below that this staggered arrangement also facilitates licker manufacturing.

To resume, the invention in its most general form relates to a rotor bladed disc flange, comprising a hub fixed to the rotor and a web covering one face of the disc and having a periphery adjacent to the disc, and original in that it comprises, on one face of the diverted web of the disc, a plurality of labyrinth seal lickers comprising cutting parts inclined towards an axial direction of the rotor and moving away from the flange towards the tapered ends of the cutter, the cutter parts of the lickers being staggered axially and radially from each other, the web and the lickers having, in an axial section, a centre of inertia separated from the disc by a radius passing through a principal flexion zone of the flange.

According to the invention, the web of the flange is the peripheral portion of this flange which covers the disc and which is characterised by having a big radial width and being sufficiently slender so that it can bend when submitted to centrifugal forces from the rotor. It thus comprises the principal flexion zone and the zones located beyond this, as far as the edge of the flange.

A portion of the web carrying the lickers can be inclined in the axial direction of the rotor moving away from disc towards the periphery adjacent to the disc, in order to encourage straightening of the web under the effect of the centrifugal forces and to reinforce the bearing of the periphery of the flange on the disc.

Other layouts according to the invention, secondary but nonetheless useful, make it possible to adjust or reinforce the bending of the web in the required direction while still enabling it to be ventilated efficiently.

BRIEF DESCRIPTION OF THE DRAWINGS

Various other objects, features, and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE DRAWINGS

The invention will now be described below, including its characteristics and advantages as a whole, referring to FIG.

Figure 2:
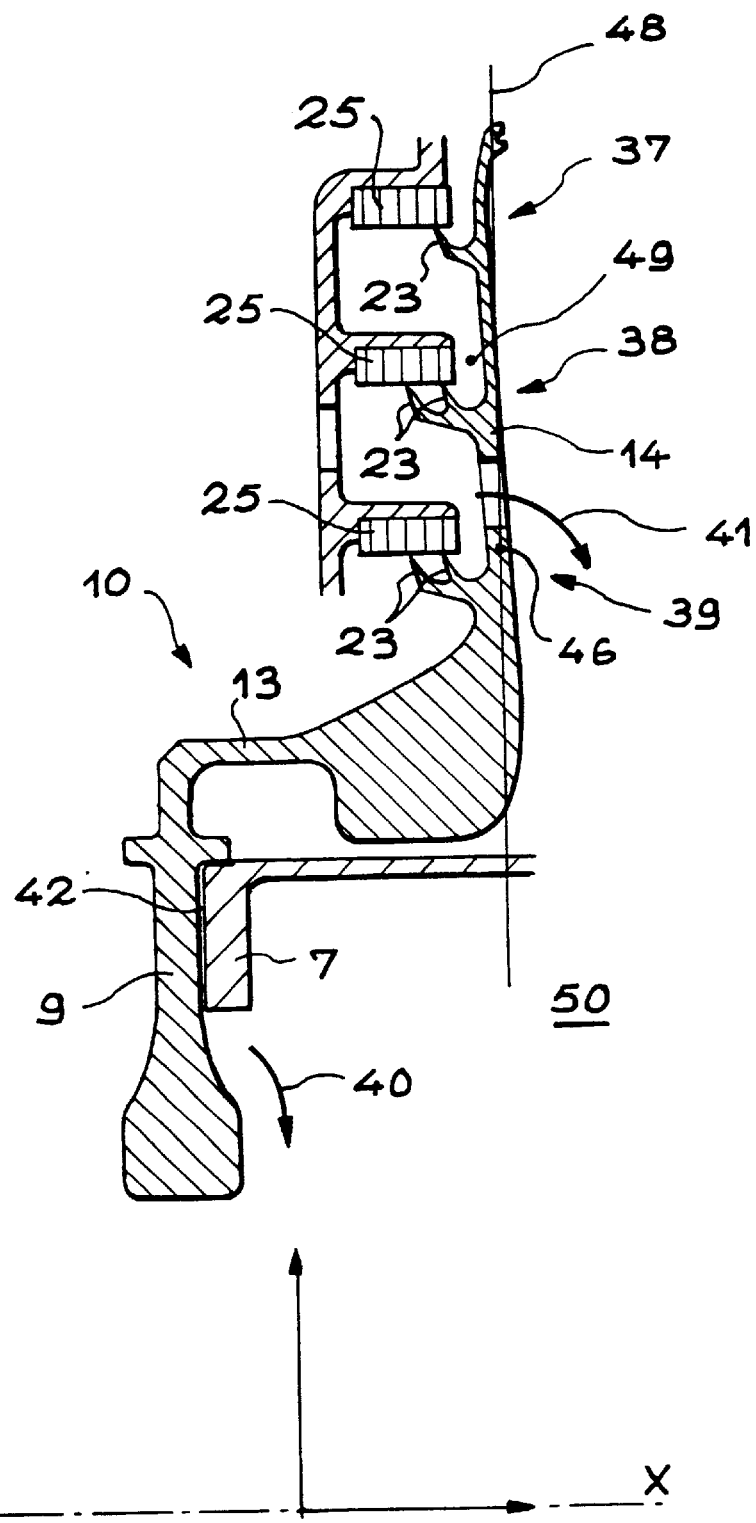
FIG. 2 shows an embodiment of a flange according to the present invention.

1, which shows a special embodiment of a flange arrangement according to the invention, and FIG. 2, which shows a variation of an embodiment of the flange.

Figure 1:
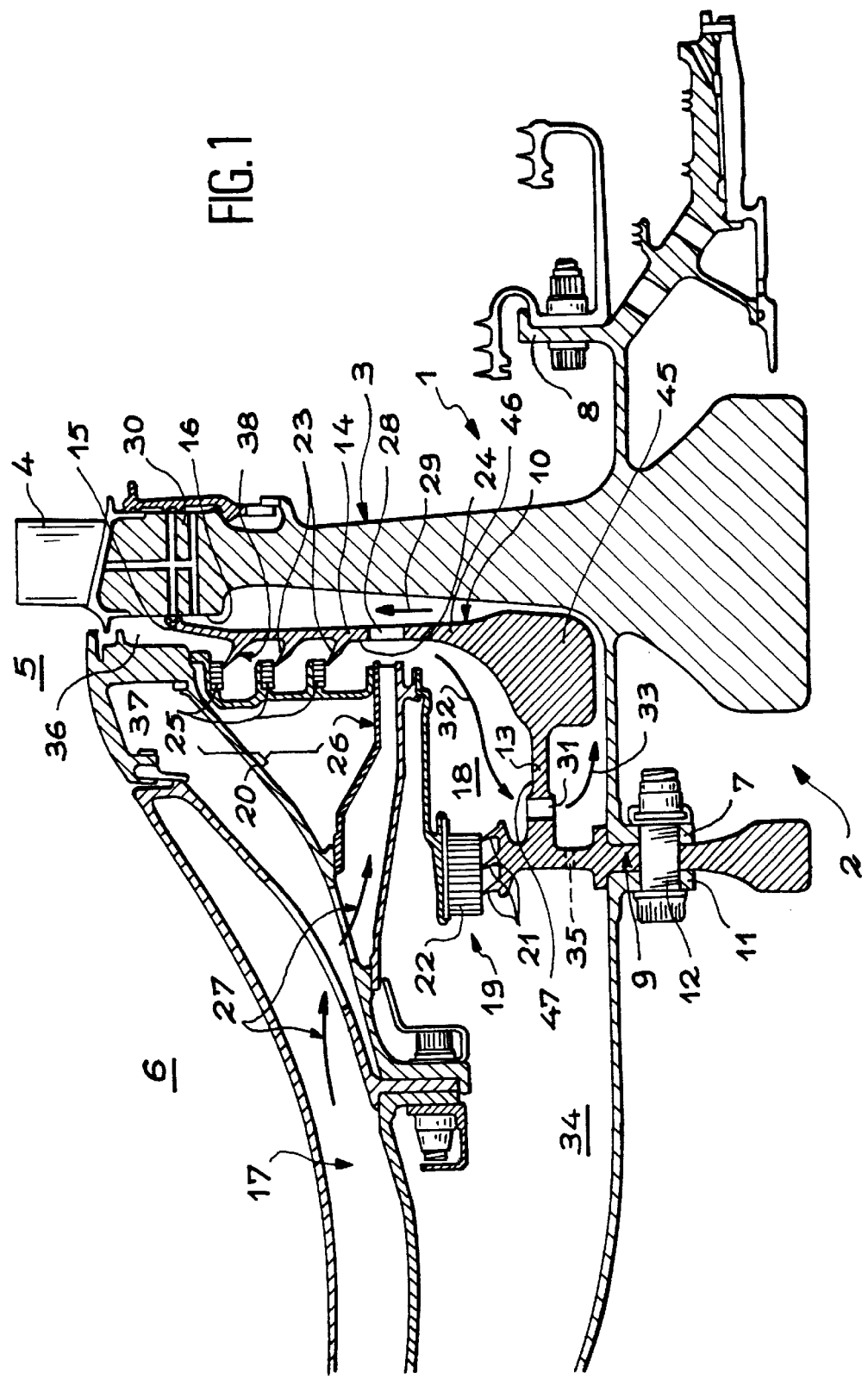
FIG. 1 shows an embodiment of a flange arrangement according to the present invention.

In FIG. 1 a rotor is given the general reference 1 and comprises in particular a section 2 with a disc 3 provided with a set of blades 4 extending into a stream 5 of gas circulation just downstream from a combustion chamber 6, which heats the blades 4 and the disc 3 highly. Section 2 ends in clamps 7 and 8 bolted to other sections of the rotor, but a hub 9 constituting the internal portion of a flange 10 is maintained between the clamp 7 and a clamp 11 of the rotor section adjacent to the section 2 with fixation bolts 12. After the hub 9, the flange extends as an arm 13, then as a web 14 forming the effective part of the flange and covering the greater part of the surface of the disc 3 facing the combustion chamber 6; the periphery of the web 14 is free and shaped with a bearing face 15 on a pressure plate 16 of the disc 3. An elbow joint 45, thick and very rigid, links the closely tubular arm 13 to the closely flat web 14, except for near the end 15 where it is inclined towards the pressure plate 16 so as to touch it. A flat shape for the web 14 was in fact shown to be advantageous for providing the required deformation; a shape tilted moving away from the disc 3, shown clearly in FIG. 2, can provide even better results.

A stator portion 17 extends in front of the disc 10 and defines a chamber 18 with it; a simple labyrinth seal 19 defines the chamber 18 on the rotor 1 side and a complex labyrinth seal 20 defines it on the gas stream side 5. The simple labyrinth seal 19 comprises circular lickers 21 tapering to a cutter, set around the hub 9, and a crown of abradable material 22, generally formed in the shape of a honeycomb or another abradable material, is fixed to the rotor portion 17 around the lickers 21. Thus, as known to those skilled in the art, the thermal expansion produced during operation of the machine and especially in the rotor 1 make the lickers 21 enter the crown of abradable material 22 and dig out grooves there; the play between the lickers and the base of the grooves of the abradable crown 22 remain minimal which, in combination with the sinuous path to be followed by the gases to cross the simple labyrinth seal 19, reduces their flow considerably.

The complex labyrinth seal 20 comprises lickers 23 in a similar manner (there are three here) set on the face 24 of the web 14 which is diverted from the disc 3, and crowns of abradable material 25 succeeding each other radially, a licker 23 being associated with a respective crown 25 in this embodiment, while a single crown 22 is common to the lickers of the other seal 19; but seal strengthening is obtained in the two cases by the multiplicity of lickers. Furthermore, the ends of the lickers 23 of the complex seal 20 are also staggered axially.

Gas is blown by a device represented only by its extremity: this is a tube 26 whose diameter is significantly smaller than the length and which opens into the chamber 18 without transition. The ventilation gas coming from another part of the reactor and following the path indicated by arrows 27 thus expands upon entering the chamber 18, becomes co-rotational with the rotor and its temperature is lowered considerably. It can then cross the web 14 of the flange 10 through passages 28 before following a centrifugal flow represented by arrows 29, making it lick the periphery of the disc 3 before entering the borings 30 which make it ventilate the heart of the disc 3 in the portion next to the blades 4.

It is advantageous for supplementary borings 31 to be made through the arm 13 in order to create a turning current, represented by arrows 32 and 33, inside the chamber 10 and passing near the simple labyrinth seal 19, then between the flange 10 and the base of the disc 3. The hub 9 is then also ventilated itself despite the presence of hotter gas in a sub-stator cavity 34 separated from the chamber 18 by the seal 19.

In certain constructions, the gas present in this sub-stator cavity 34 could nonetheless be fairly cool, and the supplementary borings 31 would then not be needed; it would even be possible to suppress them and to replace them by borings 35 making the cavity 34 communicate directly with the space comprised between the connecting arm 13 of the flange 10 and the rotor section 2 through the hub 9 so that the gas in the sub-stator cavity 34 also contributes to ventilation of the flange 10 and the disc 3.

The main function of the complex labyrinth seal 20 is to insulate the chamber 18 of a cavity under gas stream 36, adjacent to the blades 4, filled with hot gas. Nonetheless, it contributes here to an advantageous deformation of the web 14 of the flange 10 under the effect of the centrifugal forces produced when the rotor 1 turns: contrary to a frequent situation, where the lickers comprise a purely radial oriented cutter joined to the support part by a sleeve of cylindrical shape, the portions of the cutter 37 of the lickers 23 are steeply inclined in the direction of the axis XX of the rotor and located closely along the extension of the sleeves 38, which moves the centre of gravity of the lickers 23 away from the web 14. The centrifugal forces exerted on the lickers 23 then have the effect of pushing the web 14 more strongly towards the disc 3, reinforcing contact between the bearing face 15 and the pressure plate 16. This in-curving effect can be reinforced if the web 14, or at least the portion carrying the lickers 23, is also inclined in an axial direction away from the disc 3 when examining it moving away from the axis XX: the centrifugal forces produced on the web 14 tend to straighten it in a single radial plane by making it pivot around its junction with the connecting arm 13 which brings it closer to the disc 3.

Here, the main pivoting zone, reference 46, is at the transition between the web 14 and the very thick elbow 45. Each of the lickers 23 tends to straighten under the action of the centrifugal forces and thus exerts a tilting moment on the web 14 at the place where it is attached to it. The extent of this moment and its effect on the deformation of the web 14 depends on the weight of the licker 23 and its radius, its inclination and the local thickness of the web 14. The spacing of the lickers 23 in the radial direction is a significant means for adjusting the flexion of the web 14 as a whole; in the same way, the opening surface area and the number of passages 28, which are located very close to the principal flexion zone 46, have a great influence on the flexibility of the web 14.

An advantageous design for the arm 13, its length, its rigidity and the shape of its junction with the web 14 can also have an effect on the contact of the bearing face 15. If it is thin and provided with supplementary borings 31, it can open under the effect of the centrifugal forces, its sections having a secondary flexion zone 47, generally not very sensitive since the arm 13 is more rigid than the web 14 and has a smaller radius. It should also be noted that flexion around this zone 47 has the effect here of moving the web 14 away from the disc 3: it is then a disadvantage but can be tolerated if it remains reasonable.

It is still more advantageous for the cutters 37 of the lickers 23 to be set not only with different radii but at different places along the axis XX and here are not aligned, because this layout allows them to be manufactured more easily by hardening them with a plasma torch or other means. Such non-alignment is clear in FIG. 2; furthermore, the labyrinth seal comprises three groups of lickers 23 as in the preceding example, but even if the external group 37 still comprises a single licker 23, the intermediate group 38 and the internal group 39 each comprises two; each of the groups 37, 38 and 39 is still associated to a respective crown of abradable material 25. The addition of supplementary lickers at a same radius strengthens the seal for a same number of crowns in abradable material 25.

FIG. 2 also shows that the ventilation between the arm 13 and the rotor section 2 can be ensured, following the flow arrows 40 and 41, by creating grooves 42 at the junction between the clamp 7 and the hub 9, for example in the latter, so that the ventilation gas from the flange 10, coming for example through passages 28, is sucked into a rotor cavity 50, passing through the interior of the arm 13.

Finally, FIG. 2 shows the radius 48 passing through the principal flexion zone 46: it can clearly be seen that the centre of inertia 49 of the portion of the flange 10 beyond this zone 46 (which corresponds approximately to the web 14) is definitely located on the other side from the disc 3 relative to this radius 48, which is the condition for flexion in the direction required; and the inclination of the web 14 when moving away from the disc 3 becomes manifest.

What is claimed is:

1. Rotor bladed disc flange, comprising:

a hub fixed to the rotor;

a web covering one face of the disc and having a periphery of the web adjacent to the disc; and a plurality of labyrinth seal lickers on one face of the web away from the disc, and comprising cutting parts inclined towards an axial direction of the rotor and away from the flange towards tapered ends of the cutting parts, the cutting parts of the lickers being staggered axially and radially from each other, the web and the lickers having, in an axial section, a center of inertia separated from the disc by a radius passing through a principal flexion zone of the flange at a transition between the web and a stiffer part of the flange to which the web is connected.

2. Flange according to claim 1, wherein a portion of the web carrying the lickers is inclined in the axial direction of the rotor away from the disc in a radially outward direction.

3. Flange according to claim 1, further comprising:

a stator portion located in front of the face of the web away from the disc, said stator portion carrying portions engaged with the lickers of the labyrinth seal; and means for blowing cool gas opening into a chamber comprised between the flange and the stator portion, the flange being bored with passages for cool gas opposite the disc.

4. Flange according to claim 3, further comprising passages crossing a tubular portion of the flange comprised between the hub and the web, and wherein another labyrinth seal is set between the hub of the flange and the stator portion.

5. Flange according to claim 3, wherein the passages are bored through the principal flexion zone of the flange.

6. Flange according to claim 5, wherein the means for blowing ends in a chamber in an injection tube.

7. Rotor bladed disc flange, comprising:

a hub fixed to the rotor;

a web covering one face of the disc and having a periphery of the web adjacent to the disc;

a plurality of labyrinth seal lickers on one face of the web away from the disc, and comprising cutting parts inclined towards an axial direction of the rotor and away from the flange towards tapered ends of the cutting parts, the cutting parts of the lickers being staggered axially and radially from each other, the web and the lickers having, in an axial section, a center of inertia separated from the disc by a radius passing through a principal flexion zone of the flange;

a stator portion located in front of the face of the web away from the disc, said stator portion carrying portions engaged with the lickers of the labyrinth seal; and grooves for gas evacuation established through a contact joint of the hub of the flange and a clamp for fixation of the disc.

8. Flange layout according to claim 1, wherein the labyrinth seals comprise, apart from the lickers, portions of abradable material.

9. Flange according to claim 1, wherein the web is in contact with the disc only at a peripheral face bearing on the disc.

* * * * *

UNITED STATES PATENT AND TRADEMARK OFFICE
CERTIFICATE OF CORRECTION

PATENT NO. : 6,776,573 B2
DATED : August 17, 2004
INVENTOR(S) : Jean-Baptiste Arilla et al.

It is certified that error appears in the above-identified patent and that said Letters Patent is hereby corrected as shown below:

Column 2,
Line 17, change "off-centring" to -- off-centering --.

Signed and Sealed this

Twenty-third Day of November, 2004

JON W. DUDAS
*Director of the United States Patent and Trademark Office*